United States Patent [19]
Swisher, Jr.

[11] Patent Number: 5,639,181
[45] Date of Patent: Jun. 17, 1997

[54] CONSTRUCTION MACHINE HAVING COMPRESSION-MEMORY SOLID RUBBER TIRES

[76] Inventor: George W. Swisher, Jr., 1500 Dorchester Dr., Oklahoma City, Okla. 73120

[21] Appl. No.: 348,673

[22] Filed: Dec. 1, 1994

Related U.S. Application Data

[63] Continuation of Ser. No. 77,307, Jun. 15, 1993, abandoned.

[51] Int. Cl.$^6$ .............................. B60C 7/00; E01C 23/088
[52] U.S. Cl. ........................ 299/39.1; 152/323; 404/90
[58] Field of Search ........................ 404/75, 90, 91, 404/92; 299/10, 39; 152/323, 324; 180/210, 211, 212

[56] References Cited

U.S. PATENT DOCUMENTS

| | | | |
|---|---|---|---|
| 3,391,776 | 7/1968 | Hancock et al. | 180/212 X |
| 3,856,102 | 12/1974 | Queen | 180/79.2 C |
| 3,975,055 | 8/1976 | Wirtgen | 299/39 |
| 4,102,423 | 7/1978 | Reid | 180/7 R |
| 4,127,166 | 11/1978 | Wyman | 152/323 |
| 4,139,318 | 2/1979 | Jakob et al. | 404/90 |
| 4,244,413 | 1/1981 | Takahashi et al. | 152/323 |
| 4,270,801 | 6/1981 | Swisher, Jr. et al. | 299/1 |
| 4,325,580 | 4/1982 | Swisher, Jr. et al. | 299/39 |
| 4,797,025 | 1/1989 | Kennedy | 299/39 X |
| 4,966,212 | 10/1990 | Hill | 152/302 |
| 5,053,095 | 10/1991 | Hill | 152/112 |
| 5,107,913 | 4/1992 | Clonch et al. | 152/323 |
| 5,190,398 | 3/1993 | Swisher, Jr. | 404/90 |
| 5,197,785 | 3/1993 | Berry | 301/63.1 |
| 5,313,994 | 5/1994 | Hill, III et al. | 152/323 |

*Primary Examiner*—Ramon S. Britts
*Assistant Examiner*—James A. Lisehora
*Attorney, Agent, or Firm*—Dunlap & Codding, P.C.

[57] ABSTRACT

A milling machine equipped with tires of compression-memory solid rubber. The milling machine includes a frame, a plurality of wheels supporting and propelling the machine over the paved surface and a cutting assembly rotatably mounted to the frame for removing an upper layer of paving material from a paved surface. In a typical arrangement, the milling machine has two front wheels and one rear wheel. Both front wheels and the rear wheel are typical equipped with tires made of solid rubber having a durometer rating in the range of 45 to 60. Typically, the front wheels are adapted to be turned through a 45-degree range and the rear wheel has a turning range of about 90 degrees.

11 Claims, 2 Drawing Sheets

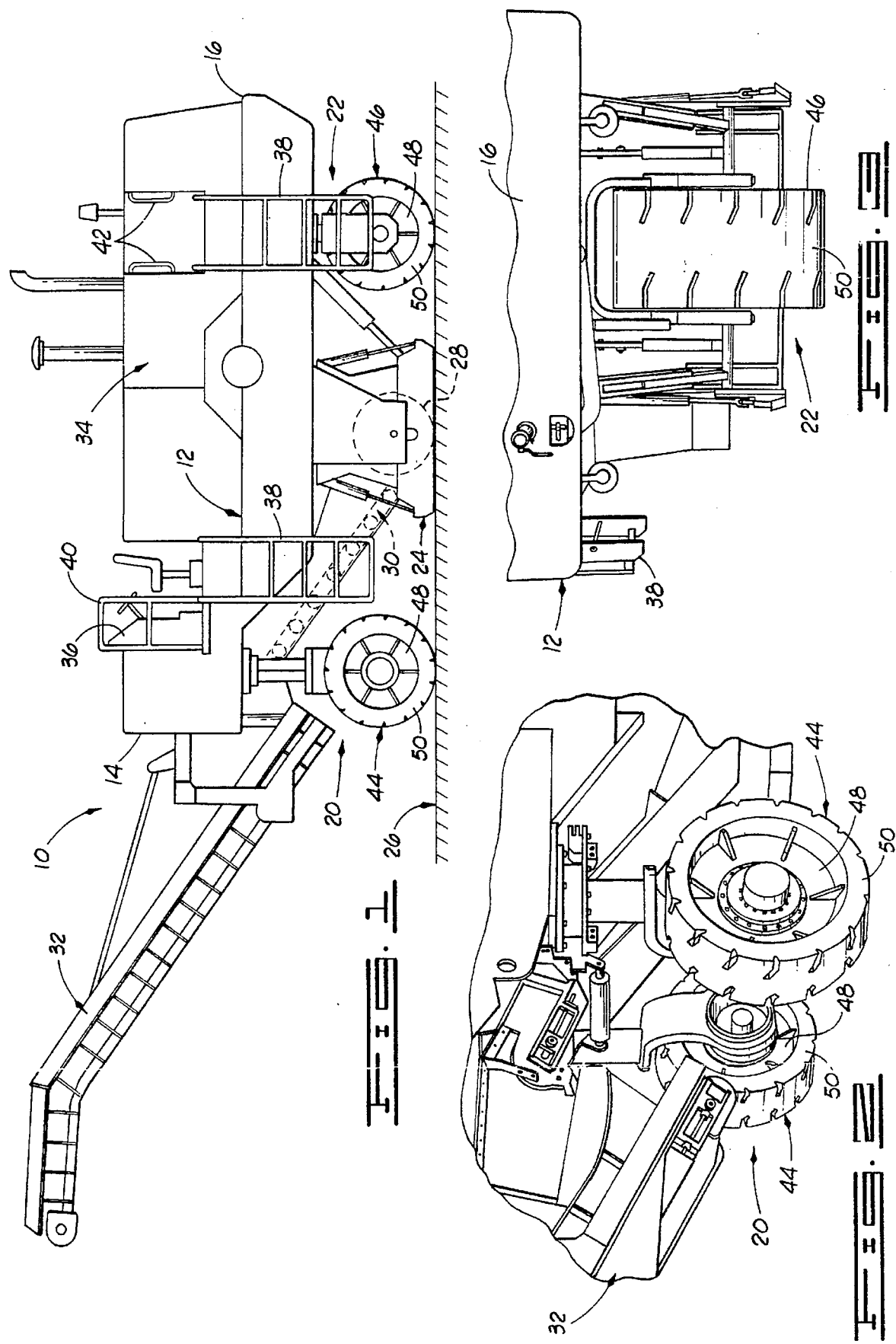

CONSTRUCTION MACHINE HAVING COMPRESSION-MEMORY SOLID RUBBER TIRES

This is a continuation of application Ser. No. 08/077,307 filed on Jun. 15, 1993, entitled "CONSTRUCTION MACHINE HAVING COMPRESSION-MEMORY SOLID RUBBER TIRES", now abandoned.

BACKGROUND OF THE INVENTION

1. Field of the Invention

The present invention relates generally to mobile construction machines and particularly, but not by way of limitation, to a self-propelled milling machine for removing pavement material.

2. Description of Related Art

Typically, construction machines are either track-mounted or wheel-mounted for movement over a surface. A track-mounted milling machine is disclosed in U.S. Pat. No. 4,325,580. Track assemblies are capable of supporting a great deal of weight and provide good stability for construction machines.

There are several disadvantages associated with tracks, however. Tracks are relatively expensive to manufacture and to maintain. In addition, it is not permissible to drive track-mounted heavy equipment on paved surfaces in some regions. Moreover, tracks generally limit the speed of a construction machine to about three mph and the turning radius to around 30 degrees.

Construction machines may also be equipped with pneumatic tires. Obviously, the likelihood of punctures is one problem with placing pneumatic tires on a construction machine. In addition, a high-pressure pneumatic tire has an upper weight-carrying limit of about 12,000 pounds and generally restricts the speed of a machine to 5 mph or less. An even greater problem with pneumatic tires, however, is their bounce. Bounce has a severely adverse effect on the stability of the machine and stability is extremely important in the operation of a machine such as a milling machine.

Hard rubber tires may be utilized in place of pneumatic tires on construction machines. Of course, hard rubber tires are not susceptible to punctures. For this reason, hard rubber tires have been used on fork-lifts and loaders in scrap yards and steel mills. In addition, hard rubber tires have good load-bearing characteristics.

Hard rubber tires perform acceptably on sufficiently strong paved surfaces, but tend to break through many pavements. In off-pavement applications, hard rubber tires do not have good traction because they do not deform to increase the surface area of the tire in contact with the ground.

SUMMARY OF THE INVENTION

The present invention is a construction machine supported for movement over a surface upon a plurality of solid rubber tires. The rubber of the tires has a uniform hardness in the range of 45 to 60 durometer.

With this particular range of hardness, the rubber of the tires deforms to increase surface contact of the tires with the pavement. Off the pavement, the deformation and the sinking of the tires into the ground increases the bearing area of the tires even more. Thus the tires provide good traction for the construction machine on pavement and increased bearing support for the machine off pavement.

Compared to pneumatic tires, the 45–60 durometer solid rubber tire does not bounce and adversely affect the stability of the construction machine. Moreover, the solid rubber tire is not subject to punctures.

The solid rubber tires may be turned at a wider range of angles than track assemblies and may be driven faster than track assemblies. In addition, the rubber tires may be run on pavement without leaving track marks on the pavement.

Other objects, features and advantages of the present invention are apparent from the following detailed description when read in conjunction with the accompanying drawings and appended claims.

BRIEF DESCRIPTION OF THE DRAWINGS

FIG. 1 is a side elevation of a milling machine constructed in accordance with the present invention and having solid rubber tires.

FIG. 2 is a perspective view of a portion of the front of the milling machine of FIG. 1 illustrating the front tires of the milling machine.

FIG. 3 is an elevational view of a portion of the rear of the milling machine of FIG. 1 illustrating the rear tire of the milling machine.

DETAILED DESCRIPTION OF THE PREFERRED EMBODIMENTS

Figure 4:
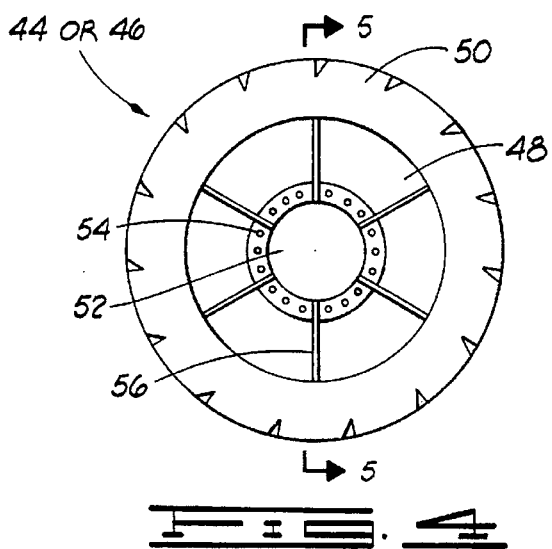
FIG. 4 is a side elevation of one of the solid rubber tires of the milling machine of FIG. 1.

The present invention is a construction machine having compression-memory solid rubber tires. As used herein, the phrase "compression-memory solid rubber tire" means a tire made with solid rubber having a durometer rating in the range of 45 to 60. The compression-memory solid rubber tire will flatten under load, return to its original shape when unloaded, and yet will not bounce.

The term "hard rubber tire," as used herein, means a tire made of rubber having a durometer rating substantially higher than 60. Hard rubber tires do not flatten or deform under load. Accordingly, hard rubber tires have substantially the same shape, whether loaded or unloaded.

Referring to the drawings in general, and to FIG. 1 in particular, shown therein and designated by the general reference numeral 10 is a milling machine, which includes a frame 12 having a front end 14 and a rear end 16, a front wheel assembly 20, a rear wheel assembly 22 and a cutting assembly 24 mounted under the frame 12. The cutting assembly 24 is adapted to be lowered to a paved surface 26 and includes a rotatable cutting drum 28 to remove an upper layer of paving material from the paved surface 26.

A base conveyor 30 extends from the cutting assembly 24 to the front end 14 of the frame 12 to carry cut paving material from the cutting assembly 24. A transfer conveyor 32 is mounted to the front end 14 of the frame 12 to receive cut paving material from the base conveyor 30 and to deposit cut paving material into transport trucks or other construction vehicles.

A power drive unit 34 is mounted on the frame 12 and drives the wheel assemblies 20 and 22, the cutting assembly 24 and other components of the machine 10. The power drive unit 34 may be any conventional power unit, such as a diesel powered engine.

Various control actuating elements, which are utilized by an operator to control and operate the machine 10, are supported in a control console 36 mounted on the frame 12. Ladders 38, guard-railing 40 and hand-rails 42 are attached to the frame 12 for the use of the operator in climbing on and off the machine 10.

A power drive unit, cutting assembly, base conveyor, transfer conveyor and other components suitable for use in the machine 10 are disclosed in U.S. Pat. No. 4,139,318, which is hereby incorporated by reference.

A conventional steering assembly (not shown) is operatively connected to the front and rear wheel assemblies 20 and 22. It is desirable that the steering assembly be capable of turning the front wheel assembly 20 through a 45-degree range and the rear wheel assembly 22 through a 90-degree range. The steering assembly should also be adapted to steer and drive the front and rear wheel assemblies 20 and 22 in front-only, rear-only, coordinated (in concert) or independent (crab) modes.

As shown in FIG. 2, the front wheel assembly 20 typically comprises two wheels 44 mounted on opposite sides of the frame 12. Each front wheel 44 may be in the range of 48 inches in diameter and 18 inches wide.

As illustrated by FIG. 3, the rear wheel assembly 22 typically includes only one rear wheel 46. The rear wheel 46 may be 48 inches in diameter and 24 inches wide.

A typical milling machine 10 has shipping weight of about 65,000 pounds and an operating weight in the range of 71,500 pounds. The rear wheel 46 and the front wheels 44 are located such that the front wheels 44 bear about 55 percent of the weight and the rear wheel 46 bears approximately 45 percent of the weight.

Figure 5:
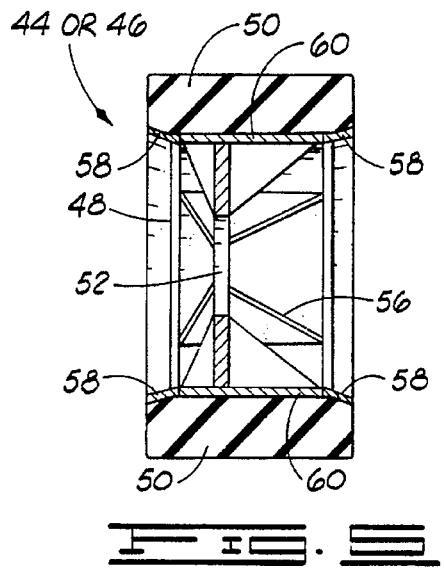
FIG. 5 is a cross-sectional view of the tire of FIG. 4 taken along the lines 5—5 of FIG. 4.

Turning now to FIGS. 4 and 5, shown therein is one of the wheels 44 or 46 of the milling machine 10. It should be appreciated that the wheels 44 of the front wheel assembly 20 are constructed in the same manner as the wheel 46 of the rear wheel assembly 22. Basically, the front wheels 44 and rear wheels 46 differ only in width as described hereinabove.

The wheel 44 or 46 includes a rim 48 and a compression-memory solid rubber tire 50. The rim 48 is generally cylindrical and is made of steel or other material having suitable rigidity and strength. A hub opening 52 extends through the rim 48 to receive the hub of an axle.

Bolt holes, one of which is designated by reference number 54, are provided around the hub opening 52 for attachment of the wheel 44 or 46 to an axle. Lug holes, threaded studs or like attachment means may be utilized in place of the bolt holes 54 to secure the wheel 44 or 46 to an axle.

A plurality of braces extend radially from the hub opening 52 to the outer edge of the rim 48. One of the braces is designated by reference numeral 56 and is generally representative of the braces of the rim 48. The braces 56 are made of steel or other structural material and provide added strength and rigidity to the rim 48.

As best shown in FIG. 5, side supports 58 extend angularly outward from each side of the outer cylinder 60 of the rim 48. The solid rubber tire 50 is secured to the outer cylinder 60 and the side supports 58.

The rubber 50 may be bonded or affixed to the rim 48 as one layer, or as a plurality of layers bonded together. A suitable construction of the wheel 44 or 46 and method for bonding the rubber tire 50 to the rim 48 is disclosed in U.S. Pat. No. 4,966,212, which is hereby incorporated by reference. It should be appreciated that the rubber tire 50 is uniform in hardness throughout and has a hardness in the range of 45 to 60 durometer.

Furthermore, steel chips or other suitable strengthening materials may be dispersed through the rubber tire to provide additional durability. If any materials are added to the rubber making up the tire 50, however, the hardness of the rubber should be adjusted to maintain the overall hardness of the tire 50 between 45 and 60 durometer.

OPERATION

Figure 6:
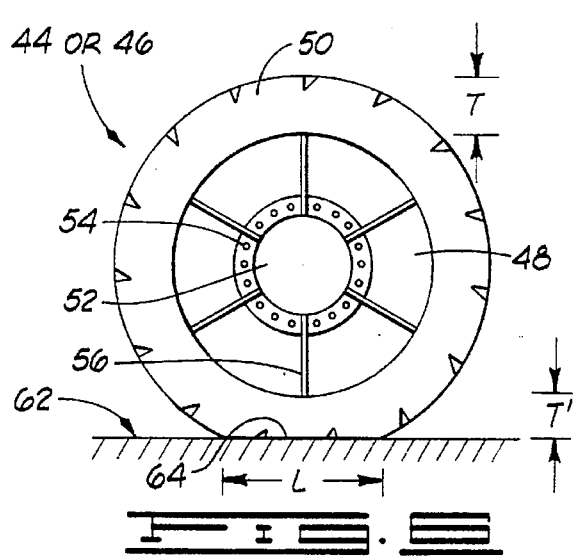
FIG. 6 is a side elevation of the tire of FIG. 4 bearing weight on a hard surface.
Figure 7:
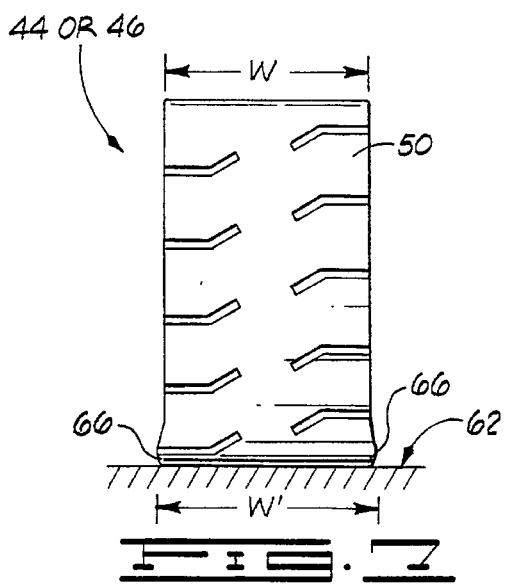
FIG. 7 is a front elevation of the tire of FIG. 6.

With reference now to FIGS. 6 and 7, shown therein is the wheel 44 or 46 in use on pavement. It should be appreciated that the wheel 44 or 46 in these figures is bearing weight in the range of about 25,000 to 35,000 pounds. Typically each front wheel 44 bears approximately 25,000 pounds and the rear wheel 46 bears about 35,000 pounds.

As shown in FIG. 6, the portion of tire 50 not in contact with the pavement 62 has normal thickness, T. Typically, this normal thickness T is about six inches. The part 64 of the tire 50 in contact with the pavement 62, however, is compressed to the thickness T'. The compressed thickness T' is typically about five inches. Thus the six-inch thick, 45 to 60 durometer rubber bearing 25,000 to 35,000 pounds compresses by about one-sixth to a four inch thickness.

In bearing the 25,000 to 35,000 pounds, the compression-memory solid rubber tire 50 flattens out such that the tire 50 is in contact with the pavement for a length L. Under the conditions just described, the length L is approximately 16 inches.

As illustrated by FIG. 7, the tire 50 has a normal width W and a width in contact with the pavement 62 of W'. As described hereinabove, the tires 50 on the front wheels 44 typically have a normal width W of 18 inches, while the tire 50 on the rear wheel 46 has a normal width of 24 inches. Under the load-bearing conditions, the portion 66 of the tire 50 in contact with the pavement 62 protrudes about one-half inch from both sides of the tire 50. Thus the width W' is about one inch wider than the normal width W.

The lengthening and widening of the tire 50 under weighted conditions increases the bearing area of the tire 50 on the pavement 62. For example, the compression-memory solid rubber tire 50 which has a normal width W of 18 inches flattens to a bearing length L of 16 inches and a bearing width of 19 inches. This results in a bearing area of 304 square inches. In contrast, a 19 inch wide hard rubber tire bearing the same weight has a bearing length of 4 inches and tapers inward to a bearing width of 18 inches. Thus a typical hard rubber tire has a bearing area of only 75 square inches.

Accordingly, the compression-memory solid rubber tire 50 with greater bearing area affords better tractive effort than the hard rubber tire. In addition, this superior tractive capability is achieved without introducing "bounce" into the tire 50. It should be appreciated that the compression-memory solid rubber tire 50 returns to its normal thickness T and width W when the tire 50 is removed from weight-bearing conditions.

Figure 8:
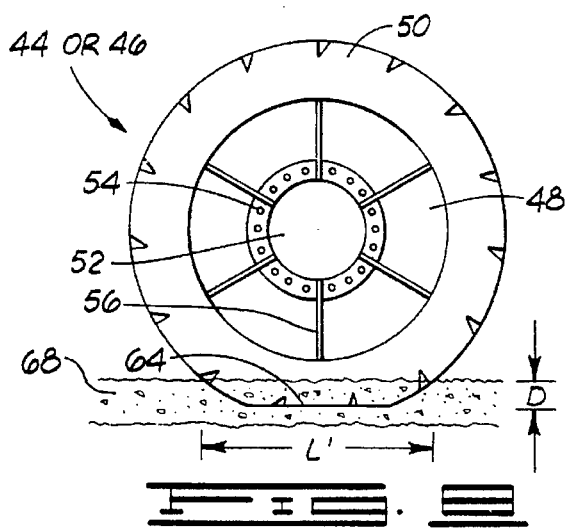
FIG. 8 is a side elevation of the tire of FIG. 4 bearing weight on an off-pavement surface.
Figure 9:
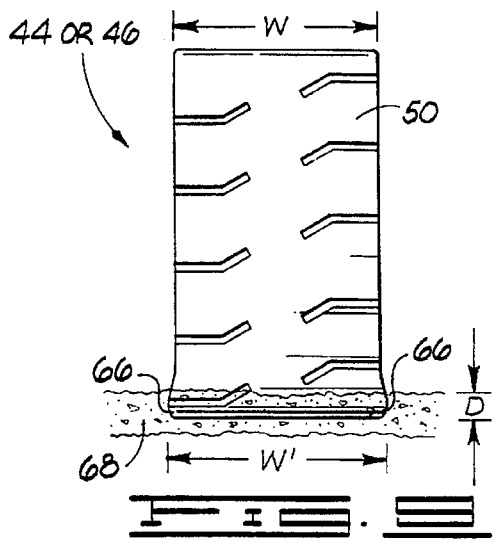
FIG. 9 is a front elevation of the tire of FIG. 8.

Referring now to FIGS. 8 and 9, shown therein is one of the front wheels 44 or the rear wheel 46 in use off pavement. Under 25,000 to 35,000 pounds of weight, the compression-memory solid rubber tire 50 sinks into the ground 68 to a depth D. of course, the depth D of the tire 50 depends upon the weight borne the wheel 44 or 46 and the softness of the ground 68.

As shown in FIG. 8, the tire 50 is in contact with the soil over a length L'. Because the tire 50 sinks into the ground 68, the length L' is greater than the on pavement length L (FIG. 6) under the same weight-bearing conditions.

As illustrated by FIG. 9, the tire 50 when off pavement has a width W' in contact with the ground 68. Thus the bearing width W' of the tire 50 is substantially the same, whether the tire 50 is on pavement (FIG. 7) or off pavement (FIG. 9).

Due to the increased weight-bearing length L', however, the tire 50 has a greater weight-bearing area off pavement than on pavement. Using the 25,000–35,000 weight on the tire 50 at a depth D of 4 inches into the soil as an example, the weight-bearing length L' is about 26 inches.

Based on the length L' of 26 inches and a 19-inch W', the weight-bearing area of the tire 50 off pavement is 494 square inches. This area is substantially greater than the 304 square inches computed for the tire 50 on pavement hereinabove. This greater bearing area gives the tire 50 increased tractive effort when used off pavement.

Constructed as described herein, the front wheels 44 and rear wheel 46 equipped with a compression-memory solid rubber tire 50 is capable of supporting a great amount of weight. In addition, the tire 50 is puncture-proof and durable. Moreover, the front wheels 44 and rear wheel 46 can be used on all types of paved surfaces without tread-marking the pavement. By flattening and deforming, the tire 50 provides good tractive effort both on pavement and off pavement.

In operation on the milling machine 10, the tire 50 does not bounce and thus provides stability to the milling machine 10. In other words, the compression-memory solid rubber tires 50 deform to become more tractive when bearing a load.

In addition, the wheels 44 or 46 may be run on the milling machine 10 at speeds up to about 10 miles per hour. This speed compares with typical speeds about 3 and 5 miles per hour for track-driven milling machines and milling machines with pneumatic tires, respectively.

Furthermore, the front wheels 44 with compression-memory solid rubber tires 50 may be adapted to turn through a range of up to 45 degrees and the rear wheel 46 with compression-memory solid rubber tires 50 may be arranged to turn through a 90-degree range. In contrast, the tracks of a typical track-driven milling machine may be turned only through a 30-degree range.

With greater maximum speed, improved turning ability, and more tractive effort without bounce, the milling machine 10 has better mobility and stability than track-driven milling machines or milling machines with hard rubber or pneumatic tires.

Changes may be made in the combinations, operations and arrangements of the various parts and elements described herein without departing from the spirit and scope of the invention as defined in the following claims.

What is claimed is:

1. A self-propelled machine for milling an upper layer of material from a surface, the machine comprising:

a frame;

a cutting assembly rotatably mounted to said frame and adapted to remove an upper layer of paving material from the surface; and a plurality of wheels rotatably mounted to said frame and supporting said frame for movement over the surface, each one of said wheels including a solid rubber tire having substantially the same durometer hardness rating throughout, the durometer hardness rating being between about 45 and 60.

2. The machine of claim 1 wherein each tire, in bearing the load of the machine, deforms from a substantially circular shape to have a substantially flat bottom area in contact with the surface.

3. The machine of claim 1 wherein each tire, in bearing the load of the machine, deforms from a substantially circular shape to have a lengthened bottom area in contact with the surface.

4. The machine of claim 1 wherein each tire, in bearing the load of the machine, deforms from a substantially circular shape to have a widened bottom area in contact with the surface.

5. A self-propelled machine for milling an upper layer of material from a surface, the machine comprising:

a frame;

a cutting assembly rotatably mounted to said frame and adapted to remove an upper layer of paving material from the surface; and a plurality of wheels rotatably mounted to said frame and supporting said frame for movement over the surface, each one of said wheels including a solid rubber tire having a durometer hardness rating being between about 45 and 60, each solid rubber tire having a rolling surface and a pair of side surfaces, the side surfaces being substantially perpendicular to the rolling surface when not bearing the load of the machine.

6. The machine of claim 5 wherein each tire deforms under the load of the machine from exactly one first rectangular area in contact with the surface to exactly one second rectangular area in contact with the surface, the first rectangular area being wholly within the perimeter of the second rectangular area.

7. The machine of claim 5 wherein the lateral surfaces are substantially flat.

8. A self-propelled machine for milling an upper layer of material from a surface, the machine comprising:

a frame;

a cutting assembly rotatably mounted to said frame and adapted to remove an upper layer of paving material from the surface; and a plurality of wheels rotatably mounted to said frame and supporting said frame for movement over the surface, each one of said wheels including a solid tire constructed of rubber having a durometer hardness rating between about 45 and 60.

9. The machine of claim 8 wherein the durometer hardness rating is substantially uniform throughout the rubber of each one of the wheels.

10. The machine of claim 9 wherein the solid tire of each one of the wheels has a substantially cylindrical outer periphery before being subjected to the load of the machine.

11. The machine of claim 8 wherein the solid tire of each one of the wheels has a substantially cylindrical outer periphery before being subjected to the load of the machine.

* * * * *